Patented Jan. 17, 1950

2,494,586

UNITED STATES PATENT OFFICE 2,494,586

CRACKING HYDROCARBONS WITH MODIFIED KAOLIN CATALYST

Hubert A. Shabaker, Media, Pa., assignor to Houdry Process Corporation, Wilmington, Del., a corporation of Delaware No Drawing. Application April 30, 1946, Serial No. 666,178

5 Claims. (Cl. 196—52)

The present invention relates to the catalytic conversion of hydrocarbons such as fractions obtained or derived from petroleum or other carbonaceous or hydrocarbonaceous materials. It is chiefly concerned with catalytic conversion employing cracking catalysts. A "cracking catalyst" is understood in the art as one promoting essentially the scission of carbon to carbon linkages in hydrocarbon compounds, although other chemical reactions including condensation may and ordinarily do coincidentally take place.

The cracking catalysts chiefly used in commercial operation comprising intimately associated silica and alumina may be products of natural origin such as acid-activated bentonite clays or masses synthetically produced by precipitation and combination of silica and alumina. There are certain abundant and inexpensive clays, of which the common kaolins are an example, which although of interest as showing some cracking activity, do not respond to acid treatment to produce catalysts of sufficiently high activity level, and for this reason or because of their tendency to produce disproportionate quantities of coke deposit compared to the yield of desired liquid products including gasoline, have not entered into commercial use as hydrocarbon conversion catalysts.

The value of a contact mass in catalytic cracking of hydrocarbon materials depends to a large extent upon its selectivity in producing from a charge stock high or acceptable yields of desired liquid products such as motor fuel with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since, even with such catalysts higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation.

The inherent catalytic properties of a catalyst with respect to comparative coke and gas making tendencies as well as its ability to produce cracked liquid products are determinable by test carried out under standardized conditions. One such test in current use is that known as the "CAT-A" method, described in "Laboratory Method for Determining the Activity of Cracking Catalysts," by J. Alexander and H. G. Shimp, page R-537, National Petroleum News, August 2, 1944. In accordance with that method, a light gas oil is subjected to contact with the catalyst under fixed cracking conditions and the activity index of the catalyst is expressed in terms of volume per cent of obtained gasoline; the weight per cent of wet gas, specific gravity of the wet gas, and the weight per cent of carbonaceous deposit are also determined. Notations of catalyst activity in the present specification have reference to that determined by the above test.

Although acid-activated bentonite clays of high cracking activity as well as synthetic silica-alumina gels are currently employed in commercial processes of hydrocarbon conversion, these synthetic catalysts offer advantages from the standpoint of higher ratios of gasoline formed to coke deposited, superior stability particularly in use with stocks causing abnormal loss of catalytic activity, and better performance characteristics in the motor fuel produced.

By the methods described in my copending application Serial No. 666,177, filed of even date herewith there can be produced from clays as starting material, catalysts demonstrating generally the desirable characteristics of synthetic silica-alumina gel catalysts. In accordance with the preferred procedure therein described, the clay is extracted with acid to an extent at least sufficient to dissolve a substantial portion of the aluminum content of the clay, which aluminum product is recovered from the acid extract liquor by precipitation and reincorporated in modified form with the residual clay mass. A silicate compound, preferably a soluble silicate such as an alkali metal silicate is employed as precipitating agent which forms a hydrous silica-alumina or a hydrated aluminum silicate as a gel or gelatinous precipitate, the reaction being advantageously controlled by suitable adjustment of the pH if it need be or the addition of a setting agent or agent accelerating gel formation. Since most clays also contain in addition to silica and alumina smaller proportions of compounds of other metals principally such as those of iron, calcium and magnesium and portions of these metal compounds may also be extracted with the aluminum compound in the acid-treating liquor, it is possible to control the composition of the gel or precipitate to be incorporated with the clay mass by purification of the acid liquor to desired extent to remove undesired metal compounds therefrom.

In accordance with the present invention hydrocarbon conversion processes of the type employing clays or other cracking catalysts are advantageously improved by the use of novel composite catalysts derived by the modification of natural clays. The catalysts employed comprise an acid treated clay composited with a silica-alumina product derived by reaction of silicate with the acid extract from the clay, and can be prepared generally by the methods described in the application above identified or as further described below.

The raw product employed as starting material for the preparation of these catalysts may be any argillaceous substance of the nature of clay having chiefly the composition of hydrosilicates of alumina and is not limited to clays such as the sub-bentonites which are normally activated by acid to high level of activity. Thus, cracking catalysts of acceptable activity level and good performance characteristics can be prepared by the described methods from relatively inactive clays and from clays which are not activatable to the extent of those conventionally employed in decolorizing or as cracking catalysts. Clays of the type commonly designated as kaolins in addition to those of the montmorillonite family including the usual bentonites accordingly come into consideration as good sources for the present catalyst preparations.

The specific details of the process for preparing the new catalysts may to some extent be governed by the type of conversion process in which it is to be used. Although in some processes of hydrocarbon conversion, as in the so-called "fluidized bed" operation, the catalyst has been employed in finely divided form, in other types of operations, including those using a fixed or moving catalyst bed, particles or pieces of larger dimension are preferred. If the catalyst is to be molded, extruded or otherwise formed into aggregates or pieces, the forming operation may be carried out on the raw clay or a finely divided clay may be acid-treated as herein described, and then formed or shaped, and the alumina from the said liquor deposited in either case on the residue of preformed clay. Since heat treatment is required to enable the clay to retain its shaped form during acid treatment, this sequence is conveniently resorted to in instances where the clay to be used as starting material has been calcined previous to acid-treatment in air or in the presence of hydrogen sulfide or other reactive gases. Not only is better acid extraction obtained as a result of the pre-calcination but preforming of the clay also offers the added convenience in separation of the acid treat liquor from the clay residue with greater facility, which is of particular advantage where impurities such as iron salts are to be removed from that liquor by precipitation methods, as will hereinafter appear.

It is preferred, however, to defer the forming step until after the acid-leached clay residue has been reincorporated with the aluminum compound precipitated from the acid liquor. This modification of the process offers certain procedural advantages. Thus, the clay can be readily acid treated, and water washed if desired, while in finely divided form and the precipitation of the aluminum, with or without previous purification of the acid liquor, can be effected in the presence of a continuous stream of clay suspended in the acid treat liquor, the soluble silicate or other precipitating agent being injected continuously into the stream. Alternatively, if the acid treat liquor is separated from the clay residue as for the precipitation and removal of undesired impurities such as iron, both that liquor and the soluble silicate solution may be injected into a stream of clay suspension or slurry. The precipitation of the alumina in the presence of the clay suspension in accordance with these embodiments can be employed to advantage with the type of continuous mixer and extruding head described in my U. S. Patent 2,370,200, issued February 27, 1945.

The extent of the acid treatment of the clay governed by such factors as concentration, time and temperature, may be varied over a wide range but should be sufficient at least to extract substantial quantities of alumina. As the acid treatment of a clay is progressively extended as measured by the quantity of alumina removed from the clay, the catalytic cracking activity of the clay is enhanced until a point of maximum or optimum activity of the clay residue is reached, beyond which, no further improvement in activity characteristics is obtained on continued acid treatment, and in fact, the activity of the clay residue may decline on further acid treatment. The extent of acid treatment for the present purpose, however, is not limited by these considerations of the activity of the obtained clay residue, since the activity of the acid treated clay residue does not necessarily determine the activity of the finished catalyst containing the redeposited alumina. As will be seen from the illustrative examples below, catalysts showing substantial improvement in activity over the original or acid treated clay are obtained whether the acid treatment is carried out short of, up to or considerably beyond that which produces optimum cracking activity of the clay residue alone. Composite catalysts of improved gasoline/coke ratios are already obtained with a mild acid treatment removing as little as 1% of the aluminum content of the clay. On the other hand, even with clays having a high content of alumina, catalysts of high activity levels may be obtained by the removal and redeposition of 90% or more of the original aluminum content. It accordingly appears that for the preparation of the composites used in accordance with the invention the extent of the acid treatment is not limited and may include treatments effecting substantially complete removal of alumina. As a general rule with most clays excellent composites are readily obtained when the acid treatment is carried out to remove more than 5% by weight and up to about 80% of the original aluminum content of the raw clay.

The rate at which alumina is extracted from a particular clay by the acid, as will readily be understood, will depend upon the kind of acid used, the dilution of the acid, the ratio of acid to clay, the temperature of treatment, and to a lesser extent upon other operating variables, the treatment being continued for the required time to effect the desired extraction. Acid treatment may be effected by but is not restricted to methods similar to those employed in known processes for "acid activation" in the manufacture of decolorizing clays. For instance concentrated mineral acid such as hydrochloric or sulfuric may be added to an aqueous suspension of clay or dilute acid may be added directly to the raw or dried clay. In known acid activation the weight ratio of acid to dry clay may be from about 20% to 100% (anhydrous acid basis) and in the present invention even higher ratios may be employed, but ratios in the order of 30 to 60% are preferred. The treatment of the clay with the acid is preferably carried out at elevated temperature as at about 160° F. to about the boiling point of the acid mixture. Although organic acids such as acetic or oxalic may be employed, mineral acid is preferred, particularly if it is desired to remove relatively large quantities of alumina from the clay. The clay may be permitted to soak in the acid or any known or desired leaching or extracting procedure may be employed. If the clay is washed with water after acid treatment, the washwater may be combined with the acid extract liquor for its content of aluminum compound, or if successive water washes are employed, the filtrates of one or more of the later washes may be discarded, or used for dilution of concentrated acid in treatment of a later batch, if desired.

Separation of the acid treated clay residue and the acid liquor is unnecessary, since the precipitant may be added directly to the mixture with suitable agitation to obtain uniformity of reaction. If the acid liquor is to be purified and the method of purification requires it, separation of the acid liquor from the clay residue may be accomplished in any known or desired manner, as by filtration or decantation. The precipitant for the aluminum compound in the acid liquor is a silicate, preferably a soluble silicate such as an alkali metal silicate, which forms therewith a gel or precipitate under appropriate pH conditions which is designated variously as hydrous silica-alumina or aluminum hydrosilicate. In order to effect faster setting of the gel or precipitate the reaction should be effected at a pH of about 5 to 10 or preferably at or above neutrality. To obtain the desired pH, the proportion of alkaline silicate added may be suitably chosen or the desired condition may be obtained by the addition of acid or alkaline reacting materials as required. The additional agent accelerating setting of the gel may be advantageously volatile or contain a volatile cation as for example ammonia or ammonium sulfate. The amount of silicate added may be varied over a wide range, but is preferably at least sufficient to furnish substantially a weight ratio of $SiO_2/Al_2O_3$ in the precipitate of 60/40, irrespective of the $SiO_2/Al_2O_3$ ratios of the original raw clay or the acid treated clay residue. Proportions of silicate giving a ratio of $SiO_2/Al_2O_3$ in the precipitate in excess of 95/5 resulted in little or no improvement in activity of the acid treated clay. The silica-alumina gel or precipitate is incorporated in the clay residue as a result of its formation in the presence of such residue, however, if the precipitation is carried out on acid extract liquor separated from the clay residue, the incorporation to form the composite is best achieved by thorough admixture of the clay residue in finely divided form with the wet or dried precipitate, for instance by milling the two together to obtain substantially uniform admixture.

Instead of purifying the acid liquor to remove iron salts or other impurities, contact masses of low iron content can also be prepared by employing for source of the alumina, clay residues in which at least a portion of the iron content has been already removed. Thus, a raw clay may be initially treated with acid for a short time and the first one or more extracts, which will contain the major portion of extractable iron, be discarded, so that further acid extraction will result in an aluminum liquor fairly low in iron impurities. If desired, even the more intimately associated and difficultly removable iron may be set free in the clay structure by treatment with a reactive gas forming iron salts, such as hydrogen sulfide for instance, (with or without a preliminary acid treatment), so that the iron content is readily extracted by even mild acid leaching as disclosed in copending applications Serial Nos. 644,421, 644,422, and 644,423, filed January 30, 1946, which issued as Patents Nos. 2,466,046, 2,466,047 and 2,466,048, respectively, on April 5, 1949.

The composite of clay and silica-alumina obtained in accordance with any of the above procedures may be finished to form a catalyst in any known or desired manner which may include in any order of sequence washing, drying and, if desired, forming into required shapes and sizes. For best results the catalyst should be finally calcined at a temperature in excess of 500° F. in air or steam or in mixtures of the same, although, if desired, the calcination step may be effected in the use of the catalyst incident to the high temperatures encountered in hydrocarbon conversion processes and regeneration of the catalyst.

Agglomerated masses or pieces of the composite contact mass may be formed by suitably breaking up a dried filter cake or more regular sizes and shapes may be obtained by dry tableting or by molding including casting or extruding of the wet or wetted comminuted material. If desired, the clay residue in finely divided form may be incorporated with a hydrosol formed from the aluminum in the acid extract liquor and the composite set as droplets in a static or turbulent water immiscible liquid to produce contact masses of the "bead" type.

In the use of the catalysts according to the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalysts as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Since in polymerization of hydrocarbons, catalysts of high activity are required, the present catalysts offer particular advantages. In carrying out such polymerization of gaseous hydrocarbons to higher molecular weight liquid products, lower temperatures and higher pressures are required than are usually employed in the cracking processes above referred to. The preferred conditions for this operation employ pressures sufficient to retain the reactants in liquid phase but generally not in excess of about 600 to 800 pounds per square inch, operating at temperatures below the critical temperatures of the particular gases, including about 0° to 450° F. for most gaseous hydrocarbons; with some gases such as isobutene even lower temperatures may be employed. Under the stated range or conditions, the reaction rate may be in the order of about 5 to 200 liters of gas per liter of catalyst per hour, the shorter contact time being employed with the higher temperatures.

*Example I*

A sample of raw kaolin clay from Eccles property, Putnam County, Florida, was ground in a ball mill with sulfuric acid of about 10% dilution (17% by weight) at room temperature for 6 to 7 days employing 368 parts by weight of concentrated acid (96.5%) diluted with 1800 parts of water per kilogram of clay. A portion of the obtained clay suspension amounting to about 405 parts by weight was diluted with a substantially equal weight of water and the diluted suspension poured with stirring into sufficient sodium silicate solution, "N-Brand,"

to furnish 135 parts by weight of $SiO_2$ diluted with 3000 parts of water. After complete mixing, the addition of 106 parts of 10% ammonium sulfate solution caused a gel to set, which had a pH of 9.1. This material was broken up and oven dried slowly at an average temperature of 180° F. The dried gel was crushed and washed four times with water. After this step, the material was treated with 10% $NH_4Cl$ solution to base exchange zeolytically held salts and then water washed until chloride free. The washed material was oven dried over night at 212° F. The dried mass was then ground in a ball mill four hours and 204 parts of the ground material mixed with 223 parts of water and cast into pellets which were oven dried.

The raw clay employed in this example had substantially the following analysis by weight on an ignited basis (containing 10–20% sand): 65.8 $SiO_2$, 32.4 $Al_2O_3$, 1.4 $Fe_2O_3$, 0.23 CaO, 0.21 MgO, 0.69 $TiO_2$.

The silica-alumina ratio in the clay residue after acid treatment was about 70:30. The proportion of clay residue to the synthetic gel in the composite was 43.5:56.5, the synthetic containing 96.2% $SiO_2$: 3.8% $Al_2O_3$.

The pellets above obtained were calcined at 1400° F. for 10 hours in the presence of 5% steam and then employed in cracking of a light East Texas gas oil under the following operating conditions: Charging 1.5 volumes of the oil (previously heated to vaporize) per volume of catalyst per hour at a temperature of about 800° F. and at atmospheric pressure, the operation being continued for ten minute periods followed by regeneration. There was obtained an average of 27.8% by volume of gasoline (410° F. cut) based on volume of fresh stock charged with the production of 1.1% by weight of coke deposited on the catalyst and 3.5% by weight of gas produced having a specific gravity of 1.25. The excellent gasoline/coke ratio is indicative of the behavior of the catalyst and demonstrates its superior properties in cracking of heavy stocks.

*Example II*

A raw kaolin clay from Putnam County, Florida, known commercially as "Edgar EPK" was milled with hydrochloric acid of 20% dilution employing about 1318 parts by weight of the dilute acid per 1000 parts of clay (25% HCl to dry clay on anhydrous basis) and then heated on a steam bath for about one-half hour, diluted and filtered. The filtrate was discarded and after washing the filter cake 1098 parts of 20% HCl added and the mix subjected to heating on the steam bath being continued for six days. The obtained thick slurry was diluted with water so that clay solids amounted to approximately ⅓ of the slurry.

655 parts of the slurry and about 1029 parts by weight of 10% $NH_4Cl$ solution were added simultaneously with stirring into sodium silicate solution, "N-Brand," to furnish 147 parts of $SiO_2$ diluted with 4000 parts of water. Gelation occurred during admixture; the final pH of the mixture being 7.5. The filtered material was oven dried over night and then treated with 10% NHCl solution and water washed until chloride free. The washed and dried material was ball mill ground, mixed with water, cast into pellets and dried at 200° F.

The raw clay employed in this example had the following analysis by weight on a dry (105° C.) sand-free basis:

|  | Percent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. metal (as oxides) | 0.52 |

The clay residue after acid treatment contained 67% $SiO_2$: 33% $Al_2O_3$. The clay residue and synthetic gel were composited in the proportions of 47.1/53.1, the synthetic containing 85% $SiO_2$: 15% $Al_2O_3$.

The pellets above obtained were calcined as in the preceding example and employed in cracking of the same stock under similar conditions as there stated. There was obtained from the charge stock 41.0% by volume of gasoline with the production of 2.7% by weight of coke and 8.6% by weight of gas of 1.52 specific gravity.

*Example III*

Eight parts by weight of a dry ground bentonite clay from Montgomery County, Alabama, heated to 150° F. were added, slowly enough to maintain the 200° F. temperature of acid solution, to a sulfuric acid solution containing 4.15 parts of concentrated $H_2SO_4$ (96.5%) and 27.8 parts of water. During the twelve hour treat approximately 8 parts of water were added to the agitated (by hot air) mixture to maintain the liquid level. After cooling for one and one-half hours, the material was filtered and washed, batchwise, with 16 parts of water each time for six times.

A portion of the acid filtrate combined with wash water liquor was treated with strong caustic solution at 85° C. for 30 to 45 minutes. The precipitate formed, which was composed chiefly of iron compounds, was removed by filtration.

A portion of the iron-freed filtrate containing .57 parts of $Al_2O_3$ were combined with 12.5 parts of the clay filter cake described in the first paragraph above. To this slurry was added a sodium silicate solution (14.5 parts "N-Brand") containing 4.15 parts $SiO_2$. The addition to this stirred mixture of 131. parts of a 1.141 sp. gr. solution of $(NH_4)_2SO_4$ caused gelation at a pH of 9.5.

This gelatinous material was filtered and fast dried at 240° F. for 2½ hours. The dried material was then washed ten times with water, treated four times with $NH_4Cl$ solution and washed chloride free. The washed material was oven dried, ground for 3 hours and then mixed for 45 minutes with about an equal quantity by weight of water, cast into pellets and dried.

The raw bentonite clay employed in this example had the following analysis by weight on a dry (105° C.) basis:

| | Percent |
|---|---|
| Ignition loss | 8.21 |
| $SiO_2$ | 60.9 |
| $Al_2O_3$ | 19.3 |
| $Fe_2O_3$ | 4.52 |
| $Na_2O$ | 0.13 |
| $CuO$ | 0.0013 |
| $CaO$ | 1.65 |
| $MgO$ | 4.87 |

The ratio of $SiO_2$: $Al_2O_3$ in the acid treated clay residue was about 81/19. There was present in the composite 66 parts of clay to 34 parts of synthetic silica-alumina gel formed, the synthetic having a ratio of 87.5 $SiO_2$:12.5 $Al_2O_3$.

The pellets above obtained calcined and used in cracking of a gas oil as in the preceding examples gave the following yields: 35% by volume gasoline, 1.8% by weight of coke and 4.1% by weight of gas of 1.47 specific gravity.

*Example IV*

The process of Example I on the same clay was repeated, employing 10% hydrochloric acid (approximately 2 parts of acid to 1 of clay) and a gel precipitated in the presence of the clay at pH of 8.7 employing sodium silicate with the addition of ammonium hydroxide. The acid treated clay residue contained 68% $SiO_2$: 32% $Al_2O_3$ and the formed gel 96% $SiO_2$: 4% $Al_2O_3$, the proportion of clay residue to gel being 60:40. After calcination in the same manner as Example I, the composite tested in the cracking of a light gas oil by the "CAT-A" method obtained 27.0% of gasoline on volume of charge with 0.9% by weight of coke and 2.7% by weight of gas of 1.25 specific gravity.

*Example V*

Four parts of the kaolin clay of Example II were treated with about 8.8 parts by weight of 20% HCl acid solution on a steam bath for one hour—the material being stirred for the first 10 minutes. After removal from the steam bath, about 1.6 parts of water were added and the material filtered. Two parts of water were added to the top of the filter cake and allowed to drain through over night.

A portion of the filtrate (containing 5.42 gms./l. $Al_2O_3$) was partially neutralized with ammonium hydroxide (concentrated) and combined with part of the acid treated clay in proportions giving 140 parts of dry clay to 1.87 parts of $Al_2O_3$ in the filtrate. The obtained gel mixture was added with 408 parts of 10% $NH_4Cl$ solution to a stirred dilute solution of sodium silicate containing 100 parts of $SiO_2$. This material was filtered, washed and purified in the manner described in the preceding examples. The washed and dried powder was mixed with water, cast, dried and calcined as above. Operating under conditions specified in Example I, there was obtained in cracking of the gas oil 27.1% by volume of gasoline, 1.0% by weight of coke and 3.2% by weight of gas of 1.34 specific gravity.

Instead of the particular brand of alkali metal silicate specifically referred to in the above examples, other soluble silicates may be employed as precipitant for the alumina, such as a solution of sodium metasilicate ($Na_2SiO_3.5H_2O$), the quantity employed being of course modified appropriately in accordance with the silica content of the particular reagent selected.

Catalyst composites of the type described in Example II, as well as those having a reduced iron content as a result of described preparation methods effecting removal of iron from the clay or the acid extract liquor, are particularly advantageous for use in cracking and reforming of sour stocks such as those of high sulfur content, which stocks in contradistinction cause abnormal deterioration and rapid loss of activity of usual commercial catalysts of the ordinary acid-activated clay type.

Obviously many modifications and variations of the invention as hereinbefore set forth may be made without departing from the spirit and scope thereof and therefore only such limitations should be imposed as are indicated in the appended claims.

I claim as my invention:

1. Process for cracking petroleum oil which comprises subjecting the oil under catalytic cracking conditions to contact with a catalyst comprising a modified clay composite of low iron content prepared by treating a kaolin clay containing iron and aluminum compounds with acid, thereby obtaining an extract containing iron in solution, discarding the iron-containing extract thus obtained, further treating the kaolin with acid to an extent sufficient to dissolve a portion thereof constituting a substantial quantity of the aluminum content of the kaolin, thereby forming an acid extract containing dissolved aluminum salt and a kaolin residue comprising silica and alumina, and reacting the aluminum salt-containing acid extract with an alkali metal silicate in the presence of said kaolin residue to precipitate an insoluble aluminum compound in said kaolin residue.

2. Process for cracking petroleum oil which comprises subjecting the oil under catalytic cracking conditions to contact with a catalyst comprising a modified clay composite of low iron content prepared by treating an iron-containing kaolin clay with a sufide gas at elevated temperature and acid leaching the sulfided kaolin to remove iron compounds, discarding the obtained acid leach liquor containing iron compounds, further treating the kaolin with acid to an extent sufficient to dissolve a portion thereof constituting a substantial quantity of the aluminum content of the kaolin, thereby forming an acid extract containing dissolved aluminum salt and a kaolin residue comprising silica and alumina, and reacting the aluminum salt-containing acid extract with an alkali metal silicate in the presence of said kaolin residue to precipitate an insoluble aluminum compound in said kaolin residue.

3. Process of converting normally liquid hydrocarbons to gasoline which comprises subjecting the hydrocarbons under catalytic cracking conditions to contact with a catalyst comprising a modified clay composite of low iron content prepared by treating a kaolin clay containing iron and aluminum compounds with acid, thereby obtaining an extract containing iron in solution, discarding the iron-containing extract thus obtained, further treating the kaolin with acid to an extent sufficient to dissolve a portion thereof comprising aluminum in an amount of more than 5% and up to 80% by weight of the aluminum content of the kaolin thus treated, thereby producing an acid extract containing dissolved aluminum salt and a kaolin residue comprising silica and alumina, and reacting the aluminum salt-containing acid extract with an alkali metal silicate in the presence of said kaolin residue to precipitate an insoluble aluminum compound in said kaolin residue.

4. Process of converting normally liquid hydrocarbons to gasoline which comprises subjecting the hydrocarbons under catalytic cracking conditions to contact with a catalyst comprising a modified clay composite of low iron content prepared by treating a kaolin clay containing iron and aluminum compounds with acid, thereby obtaining an extract containing iron in solution, discarding the iron-containing extract thus obtained, further treating the kaolin with acid to an extent sufficient to dissolve a portion thereof comprising aluminum in an amount of more than 5% and up to 80% by weight of the aluminum content of the kaolin thus treated, thereby producing an acid extract containing dissolved aluminum salt and a kaolin residue comprising silica and alumina, and reacting at least a portion of the aluminum salt-containing acid extract with an alkaline solution of a silicate in a proportion based on the quantity of aluminum in the reacting extract to precipitate silica-alumina in a weight ratio of $SiO_2/Al_2O_3$ in the precipitate of at least 60/40, the reaction with said silicate solution being carried out in the presence of the kaolin residue, thereby incorporating the silica-alumina precipitate in the said residue.

5. Process in accordance with claim 4 wherein the reaction with said silicate solution is effected at a pH of about 5 to about 9.

HUBERT A. SHABAKER.

REFERENCES CITED

The following references are of record in the file of this patent:

UNITED STATES PATENTS

| Number | Name | Date |
| --- | --- | --- |
| 1,898,830 | Guthrie et al. | Feb. 21, 1933 |
| 2,282,922 | Ahlberg et al. | May 12, 1942 |
| 2,288,874 | Anderson et al. | July 7, 1942 |
| 2,320,799 | Ruthruff | June 1, 1943 |
| 2,369,001 | Ahlberg et al. | Feb. 6, 1945 |
| 2,374,313 | Veltman | Apr. 24, 1945 |
| 2,388,302 | Weyl | Nov. 6, 1945 |
| 2,410,436 | Ewing | Nov. 5, 1946 |